United States Patent
Rodriguez Bernal

(10) Patent No.: US 12,279,926 B1
(45) Date of Patent: Apr. 22, 2025

(54) HORIZONTAL TRANSALVEOLAR IMPLANT SYSTEM

(71) Applicant: Jesus David Rodriguez Bernal, Miami, FL (US)

(72) Inventor: Jesus David Rodriguez Bernal, Miami, FL (US)

( * ) Notice: Subject to any disclaimer, the term of this patent is extended or adjusted under 35 U.S.C. 154(b) by 0 days.

(21) Appl. No.: 18/950,521

(22) Filed: Nov. 18, 2024

(51) Int. Cl.
   *A61C 8/00* (2006.01)

(52) U.S. Cl.
   CPC ............ *A61C 8/0025* (2013.01); *A61C 8/008* (2013.01); *A61C 8/0093* (2013.01)

(58) Field of Classification Search
   CPC ........... A61C 8/001; A61C 8/003; A61C 8/00; A61C 8/0025; A61C 8/008; A61C 8/0093
   See application file for complete search history.

(56) References Cited

U.S. PATENT DOCUMENTS

| | | | | |
|---|---|---|---|---|
| 3,919,772 A * | 11/1975 | Lenczycki | ............. | A61C 8/001 433/173 |
| 4,516,937 A * | 5/1985 | Bosker | ............. | A61C 8/00 433/173 |
| 5,439,381 A * | 8/1995 | Cohen | ............. | A61C 8/0033 433/177 |
| 2002/0031747 A1* | 3/2002 | Laster | ............. | A61C 8/001 433/201.1 |
| 2013/0209959 A1* | 8/2013 | Peer | ............. | A61C 1/084 433/174 |
| 2013/0266911 A1* | 10/2013 | Weissman | ............. | A61C 8/0009 433/173 |
| 2023/0019402 A1* | 1/2023 | Di Giulio | ............. | A61C 8/0092 |

FOREIGN PATENT DOCUMENTS

| | | | | |
|---|---|---|---|---|
| DE | 19653763 A1 * | 6/1998 | ............. | A61C 1/084 |
| FR | 2647666 * | 12/1990 | | |
| FR | 2647666 A * | 12/1990 | ............. | A61C 8/001 |
| FR | 2848096 A1 * | 6/2004 | ............. | A61C 8/001 |
| WO | WO-2010118444 A1 * | 10/2010 | ............. | A61C 8/001 |
| WO | WO-2011015694 A1 * | 2/2011 | ............. | A61C 8/001 |
| WO | WO-2014091482 A1 * | 6/2014 | ............. | A61C 8/001 |
| WO | WO-2014203149 A1 * | 12/2014 | ............. | A61C 1/085 |

* cited by examiner

*Primary Examiner* — Ralph A Lewis

(74) *Attorney, Agent, or Firm* — Ruben Alcoba, Esq.

(57) ABSTRACT

A horizontal transalveolar implant system designed to support dental implants in cases where vertical bone height is insufficient. The system features a linear anchor with a threaded body, a drilling tip, and a torque area. It includes transversal screw receiving apertures that hold removable sealing screws, which are replaced by threaded dental implant receivers after insertion. The system allows for secure attachment of abutments and dental crowns. This innovative design anchors lengthwise in the alveolus, eliminating the need for sinus lifts and possibly bone grafts, providing a stable foundation for dental restorations. The anchor measures approximately 30 to 35 mm in length and 3 to 4 mm in diameter, making it suitable for cases with minimal vertical bone availability.

6 Claims, 4 Drawing Sheets

HORIZONTAL TRANSALVEOLAR IMPLANT SYSTEM

BACKGROUND

The present invention is directed to a horizontal transalveolar implant system that supports dental implants.

Transalveolar implants typically require alveolar ridges with a height greater than 5 mm in both the maxilla and mandible. Cases with lesser vertical bone height (5 mm or less) require invasive surgical procedures to provide sufficient bone mass that is necessary to ensure the satisfactory attachment of the dental implant. These invasive surgical procedures involve longer surgical times and higher risk of complications, and result in longer recovery times and increased patient discomfort.

One example of these invasive surgical procedures is a maxillary sinus lift, which is performed for implants in the maxilla and consists of providing bone under the maxillary sinus for the placement of the dental implant. The primary complication of this procedure is the perforation of the sinus membrane. It can also result in the instability of the dental implant in cases of minimal vertical bone height.

The present horizontal transalveolar implant system is designed to fit into short alveoli with a vertical bone height of 5 mm or less without the need to provide additional bone mass to secure the dental implant, which minimizes surgical invasiveness.

SUMMARY

The present invention is a horizontal transalveolar implant system designed to support dental implants, particularly in cases where the alveolar ridge has insufficient height. The system is anchored horizontally into the upper or lower jawbone to provide a stable foundation for dental prosthetics.

The implant system includes: a linear anchor with a threaded body, the first end is a drilling tip for insertion and the second end includes a torque area for secure placement, the linear anchor features at least two transversal screw receiving apertures for securing additional components and is designed to be inserted lengthwise along the alveolus to maximize support; removable sealing screws that fit into the transversal screw receiving apertures during the initial placement, which can be removed once the anchor is secured; threaded dental implant receivers that are inserted into the transversal screw receiving apertures after the sealing screws are removed, and that serve as the foundation for attaching the dental implants; abutments that connect to the threaded dental implant receivers, allowing the attachment of dental crowns; and dental crowns that are affixed to the abutments to complete the dental restoration.

The system may also include: closing screws to seal treaded dental implant receivers that may not be inserted a dental implant; and a torque closing screw to seal the torque area once the linear anchor is fully inserted.

The linear anchor measures between approximately 30 mm to 35 mm in length and 3 mm to 4 mm in diameter, making it suitable for various dental applications where vertical bone height is limited.

This innovative horizontal implant system offers a solution for patients with compromised alveolar ridges, enabling secure and long-lasting dental restorations without the need for invasive bone grafting procedures.

A primary object of the present invention is to provide a horizontal transalveolar implant system that overcomes the limitations of traditional vertical dental implants. Conventional dental implants typically require a significant amount of vertical bone height for successful anchoring, which often necessitates invasive procedures such as bone grafting or sinus lifts in cases where the alveolar ridge has been compromised due to bone resorption or trauma.

In contrast, the horizontal transalveolar implant system is specifically designed to be anchored lengthwise into the alveolus. This innovative approach eliminates the need for additional surgical procedures by utilizing the horizontal dimension of the jawbone, making it ideal for patients with reduced vertical bone height (5 mm or less). The linear anchor, combined with transversal screw apertures and detachable components, ensures a stable and robust foundation for dental prosthetics while minimizing surgical invasiveness, recovery time, and patient discomfort.

The invention thus addresses the challenges associated with traditional implant methods by offering a less invasive, cost-effective, and efficient solution for dental restorations, particularly in patients who would otherwise require extensive bone augmentation procedures.

BRIEF DESCRIPTION OF THE DRAWINGS

These and other features, aspects, and advantages of the present invention will become better understood with regards to the following description, appended claims, and drawings where:

DESCRIPTION

Figure 1:
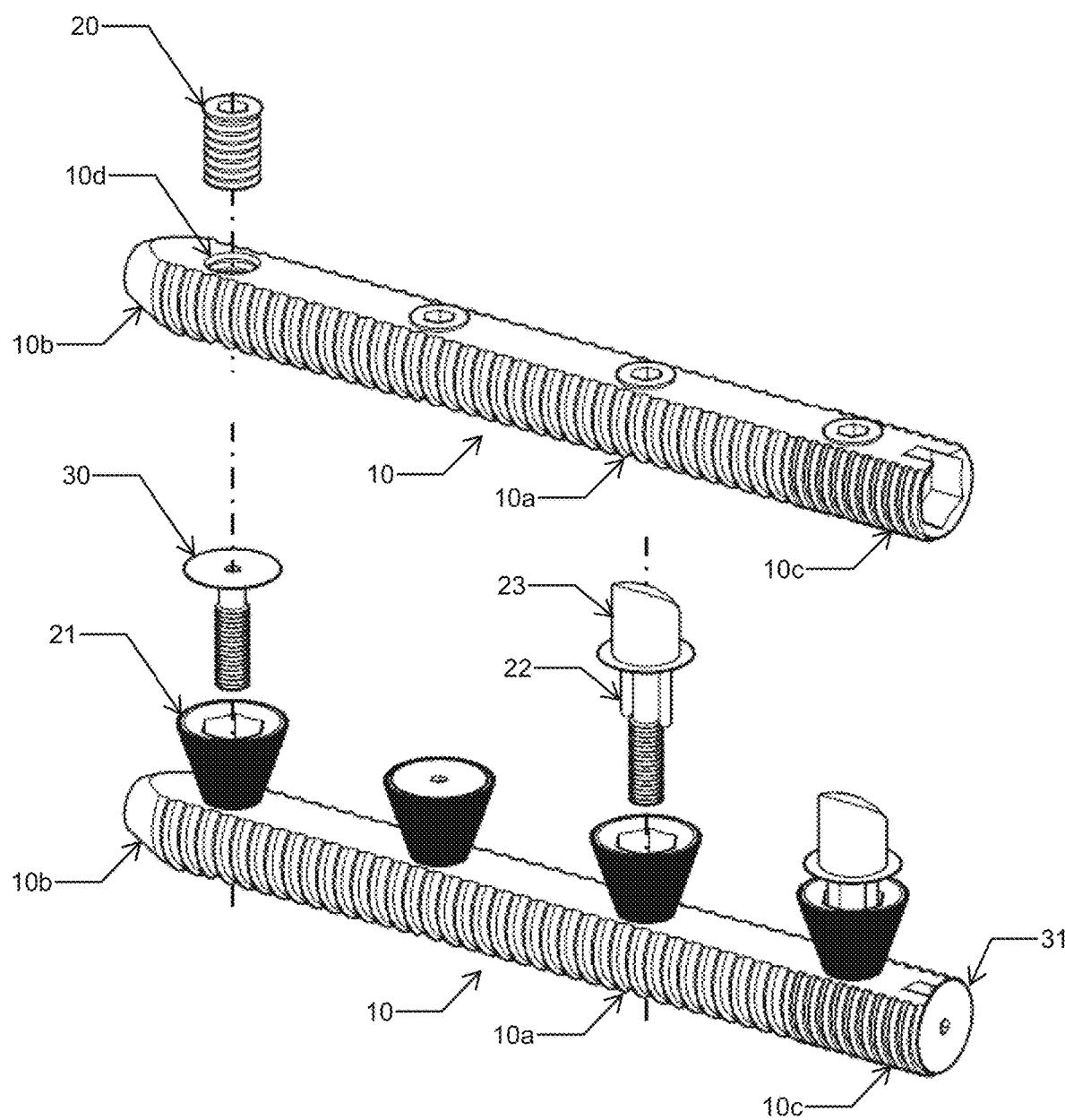
FIG. 1 is a perspective view of the present invention.
Figure 2:
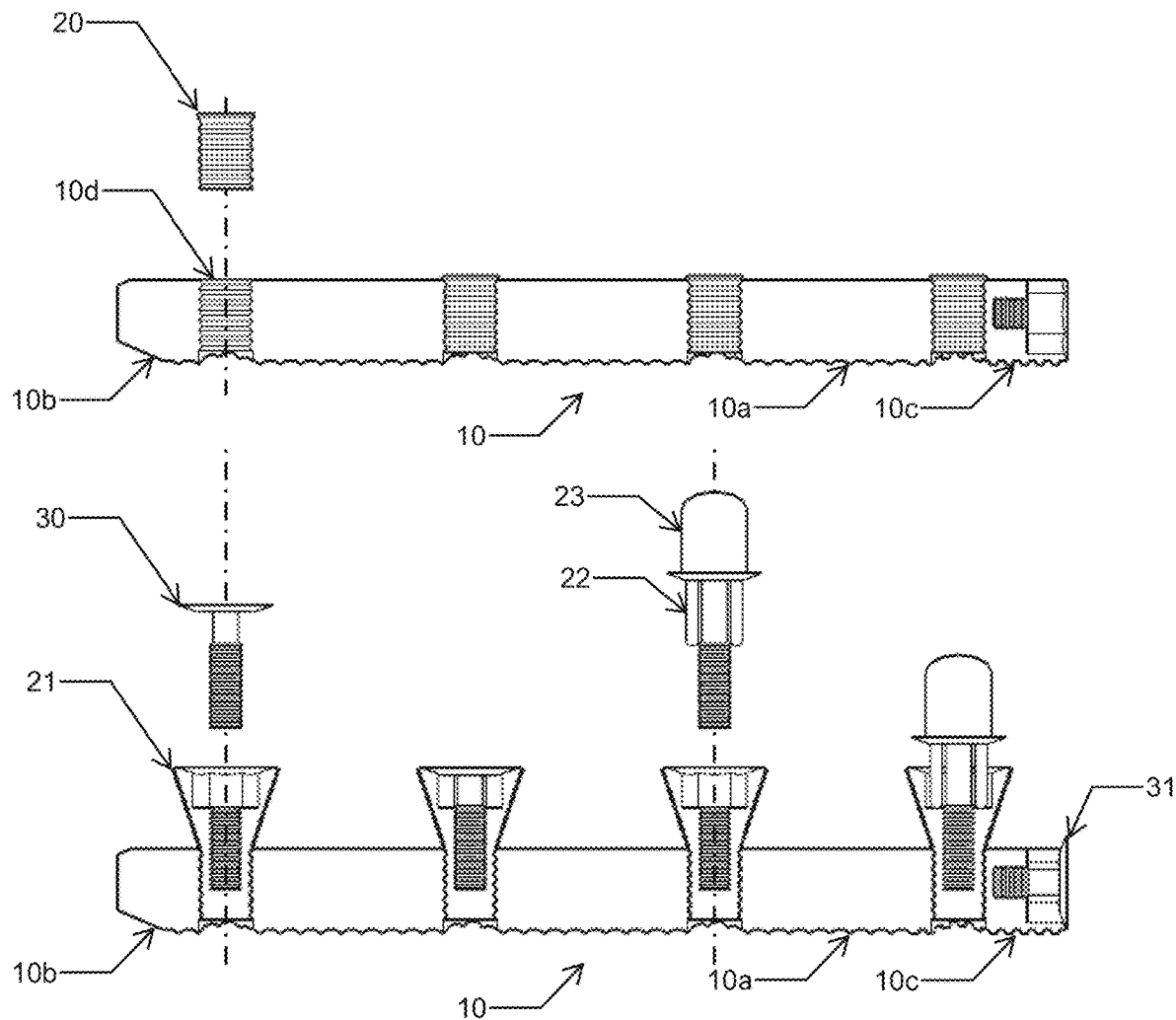
FIG. 2 is a front side view of the present invention.
Figure 3:
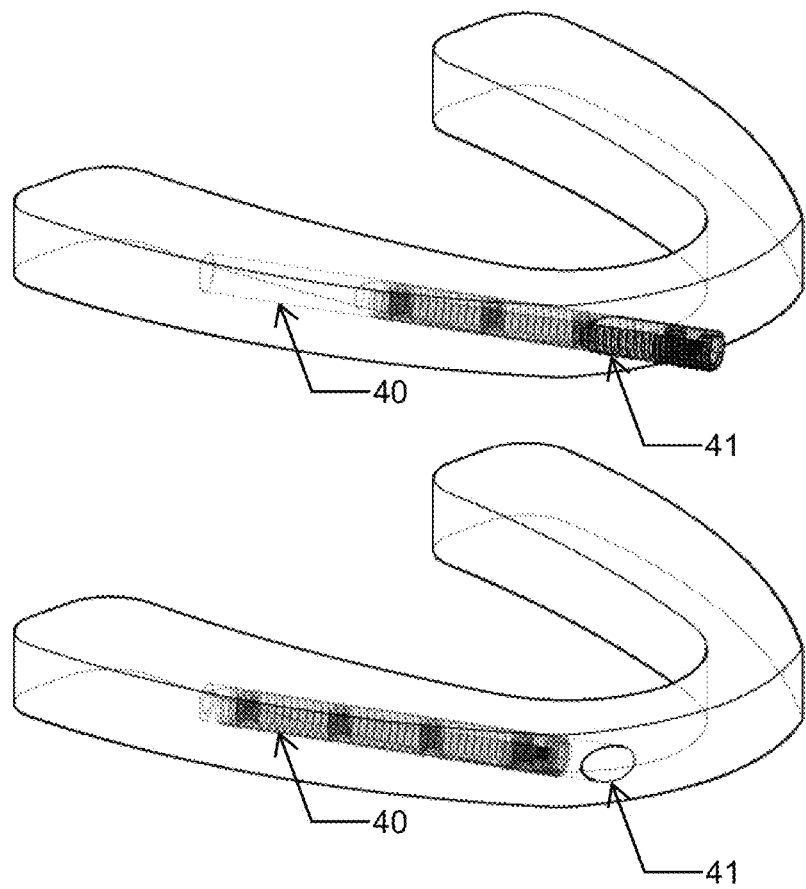
FIG. 3 includes two perspective views of the present invention anchored in the mandible using a first method of anchoring.
Figure 4:
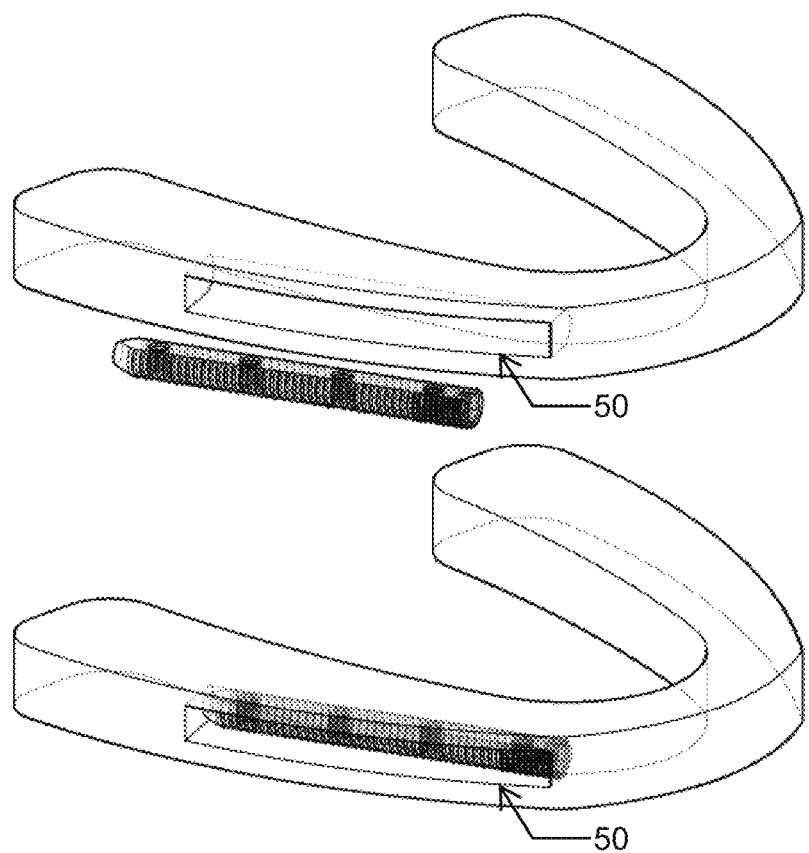
FIG. 4 includes two perspective views of the present invention anchored in the mandible using a second method of anchoring.

As Seen in FIGS. 1-4, the present invention is a horizontal transalveolar implant system that supports dental implants.

The horizontal transalveolar implant system comprises a linear anchor 10 that has a threaded body 10a, the first end defines a drilling tip 10b and the second end defines a torque area 10c, the linear anchor defines at least two transversal screw receiving apertures 10d, the linear anchor is configured to be anchored lengthwise in the upper or lower alveolus. At least two removable sealing screws 20 that insert within the at least two transversal screw receiving apertures 10d, the at least two removable sealing screws 20 are configured to be removed from the linear anchor 10 after the linear anchor 10 is anchored in the upper or lower alveolus. At least two threaded dental implant receivers 21 that secure within the at least two transversal screw receiving apertures 10d after the at least two removable sealing screws 20 are removed from the at least two transversal screw receiving apertures 10d. At least one abutment 22 that screws into the at least two threaded dental implant receivers 21. And, at least one dental crown 23 that is fixedly attached to the at least one abutment 22.

In an embodiment of the present invention, the horizontal transalveolar implant system comprises at least one closing screw 30 that screws into at least one of the at least two threaded dental implant receivers 21.

In another embodiment of the present invention, the horizontal transalveolar implant system comprises a torque closing screw 31.

In yet another embodiment of the present invention, the linear anchor measures, from the first end to the second end, from about 30 mm to about 35 mm in length, and the diameter measures from about 3 mm to about 4 mm.

A method of anchoring lengthwise the present invention in the upper or lower alveolus comprises inserting the threaded body into a horizontal hole 40 in the upper or lower alveolus through a point of entry 41.

Yet another method of anchoring lengthwise the present invention in the upper or lower alveolus comprises inserting the threaded body into an elongated opening 50 in the upper or lower alveolus that is accessible from the anterior alveolar border.

An advantage of the present invention is that it provides the possibility of rehabilitating alveoli with reduced vertical bone height (5 mm or less) with minimal surgical invasiveness, which reduces recovery time and patient discomfort.

Another advantage of the present invention is that it provides optimal osteointegration.

Yet another advantage of the present invention is that is provides an enhanced load distribution capability due to its larger surface area and horizontal orientation, and the possibility of immediate loading.

The embodiments of the horizontal transalveolar implant system herein are exemplary and numerous modifications, combinations, variations, and rearrangements can be readily envisioned to achieve an equivalent result, all of which are intended to be embraced within the scope of the appended claims. Further, nothing in the above-provided discussions of the horizontal transalveolar implant system should be construed as limiting the invention to an embodiment or a combination of embodiments. The scope of the invention is defined by the description, drawings, and claims.

What is claimed is:

1. A horizontal transalveolar implant system that supports dental implants, the horizontal transalveolar implant system comprises:
   a linear anchor that has a threaded body, the first end defines a drilling tip and the second end defines a torque area, the linear anchor defines at least two transversal screw receiving apertures, the linear anchor is configured to be anchored lengthwise in the upper or lower alveolus;
   at least two removable sealing screws that insert within the at least two transversal screw receiving apertures, the at least two removable sealing screws are configured to be removed from the linear anchor after the linear anchor is anchored in the upper or lower alveolus;
   at least two threaded dental implant receivers that secure within the at least two transversal screw receiving apertures after the at least two removable sealing screws are removed from the at least two transversal screw receiving apertures;
   at least one abutment that screws into at least one of the at least two threaded dental implant receivers; and
   at least one dental crown that is fixedly attached to the at least one abutment.

2. The horizontal transalveolar implant system that supports dental implants of claim 1, wherein the horizontal transalveolar implant system comprises at least one closing screw that screws into at least one of the at least two threaded dental implant receivers.

3. The horizontal transalveolar implant system that supports dental implants of claim 2, wherein the horizontal transalveolar implant system comprises a torque closing screw.

4. The horizontal transalveolar implant system that supports dental implants of claim 3, wherein the linear anchor measures, from the first end to the second end, from about 30 mm to about 35 mm in length, and the diameter measures from about 3 mm to about 4 mm.

5. A first method of anchoring lengthwise the horizontal transalveolar implant system that supports dental implants of claim 1 in the upper or lower alveolus, wherein the threaded body is inserted into a horizontal hole in the upper or lower alveolus through a point of entry.

6. A second method of anchoring lengthwise the horizontal transalveolar implant system that supports dental implants of claim 1 in the upper or lower alveolus, wherein the threaded body is inserted into an elongated opening in the upper or lower alveolus that is accessible from the anterior alveolar border.

* * * * *